(12) United States Patent
Hsu

(10) Patent No.: US 9,592,870 B2
(45) Date of Patent: *Mar. 14, 2017

(54) BICYCLE WITH AN INTELLIGENT SYSTEM

(71) Applicant: Tau-Jeng Hsu, Shenzhen (CN)

(72) Inventor: Tau-Jeng Hsu, Shenzhen (CN)

(73) Assignee: MEIZHOU XIUYING ENTERPRISE COMPANY LIMITED, MeiXian (CN)

( * ) Notice: Subject to any disclaimer, the term of this patent is extended or adjusted under 35 U.S.C. 154(b) by 46 days.

This patent is subject to a terminal disclaimer.

(21) Appl. No.: 14/576,220

(22) Filed: Dec. 19, 2014

(65) Prior Publication Data

US 2015/0102919 A1  Apr. 16, 2015

(51) Int. Cl.
| | |
|---|---|
| B62J 6/00 | (2006.01) |
| B60R 1/00 | (2006.01) |
| B62J 6/04 | (2006.01) |
| B62J 6/02 | (2006.01) |
| B62J 33/00 | (2006.01) |
| B62J 3/00 | (2006.01) |
| B62J 7/02 | (2006.01) |
| B62J 99/00 | (2009.01) |

(52) U.S. Cl.
CPC ............. B62J 6/001 (2013.01); B62J 6/04 (2013.01); B62J 7/02 (2013.01); B62J 3/00 (2013.01); B62J 2099/0006 (2013.01); B62J 2099/0026 (2013.01)

(58) Field of Classification Search
CPC ........ B62J 2099/0006; B62J 2099/0026; B62J 3/00; B62J 6/001; B62J 6/04; B62J 7/02; B62J 6/02; B62J 33/00; B60Q 1/2615; B60Q 5/005; B60Q 9/00; B60R 1/00; B60R 2300/301; B60R 2300/302

See application file for complete search history.

(56) References Cited

U.S. PATENT DOCUMENTS

| 7,714,704 | B1 * | 5/2010 | Mellen | B60R 1/00 340/425.5 |
|---|---|---|---|---|
| 2003/0159870 | A1 * | 8/2003 | Yu | B62M 6/45 180/206.2 |
| 2008/0119330 | A1 * | 5/2008 | Chiang | A63B 24/00 482/8 |
| 2010/0171832 | A1 * | 7/2010 | Solida | B62J 99/00 348/148 |

* cited by examiner

Primary Examiner — Sisay Yacob
(74) Attorney, Agent, or Firm — Rabin & Berdo, P.C.

(57) ABSTRACT

An intelligent system for a bicycle is provided with a control assembly including a seat bag control device, a sensor device, a digital camera, a lighting device, a warning device, and a power supply for supplying DC power to above components; and a display assembly including an LCD screen, a processing module, a communications module, and a power module for electrically interconnecting the LCD screen, the processing module, and the communications module. The seat bag control device includes a microprocessor, a memory, and a wireless communications module. The sensor device includes an optical sensor, a thermometer, an acceleration sensor, a barometer, a gyroscope, an electronic compass, a radar, and a GPS. The digital camera includes a rear camera. The lighting device includes an auxiliary light, a rear light, a directional light, and a decoration light. The warning device includes a loudspeaker and a vibration module.

5 Claims, 5 Drawing Sheets

BICYCLE WITH AN INTELLIGENT SYSTEM

BACKGROUND OF THE INVENTION

1. Field of the Invention

The invention relates to bicycles and more particularly to a bicycle including a control assembly mounted on a seat bag, a display assembly mounted on the handlebars, and an auxiliary assembly mounted on the seat bag and the handlebars.

2. Description of Related Art

Bicycles are a convenient, low-cost and environmental friendly form of transport. To enhance strength, comfort and functionality of bicycles, many auxiliary devices have been proposed. For example, there is a device incorporating rear-view mirror(s), a camera, and a display mounted on a bicycle. While it is simple, it is not practical.

The danger of riding a bicycle is about the same as driving a car or a motorcycle. It is suggested that front and rear lights should be installed on a bicycle. But it is often that a rider forgets to turn on the lights in the night. Further, there is a need of installing a stand on the handlebars or some part of a bicycle for anchoring a mobile phone or a music playing device so that a rider may listen to music while driving.

In light of above, the need for improvement of a bicycle still exists.

SUMMARY OF THE INVENTION

It is therefore one object of the invention to provide an intelligent system for a bicycle including a saddle, a seat bag, a frame, two wheels, and handlebars, comprising a control assembly mounted on the seat bag and including a seat bag control device, a sensor device, a digital camera, a lighting device, a warning device, and a power supply for supplying direct current (DC) power to the seat bag control device, the sensor device, the digital camera, the lighting device, and the warning device for electrical interconnection; and a display assembly mounted on the handlebars and including a liquid crystal display (LCD) screen, a processing module, a communications module, and a power module for electrically interconnecting the LCD screen, the processing module, and the communications module; wherein the seat bag control device includes a microprocessor, a memory, and a wireless communications module electrically interconnected; wherein the sensor device includes an optical sensor, a thermometer, an acceleration sensor, a barometer, a gyroscope, an electronic compass, a radar, and a global positioning system (GPS); wherein the digital camera includes a rear camera; wherein the lighting device includes an auxiliary light, a rear light, a directional light, and a decoration light; and wherein the warning device includes a loudspeaker and a vibration module.

The above and other objects, features and advantages of the invention will become apparent from the following detailed description taken with the accompanying drawings.

DETAILED DESCRIPTION OF THE INVENTION

Figure 1:
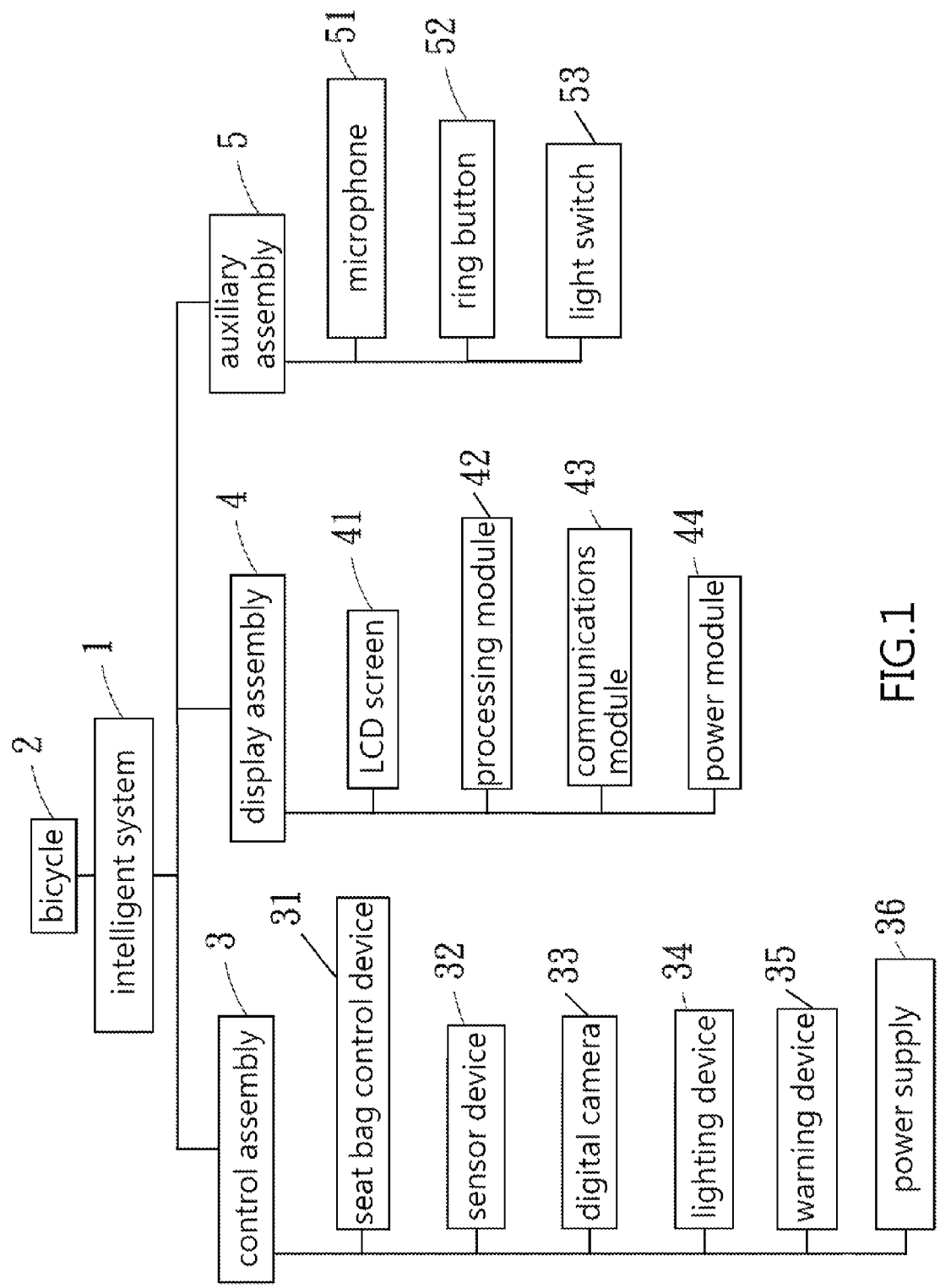
FIG. 1 is a block diagram of an intelligent system for a bicycle according to the invention.
Figure 2A:
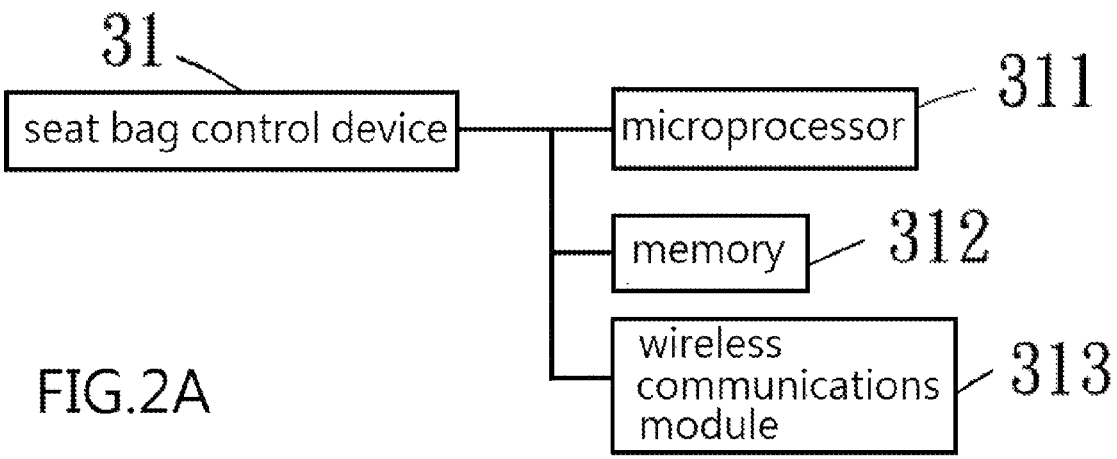
FIG. 2A is a block diagram of the seat bag control device.
Figure 2B:
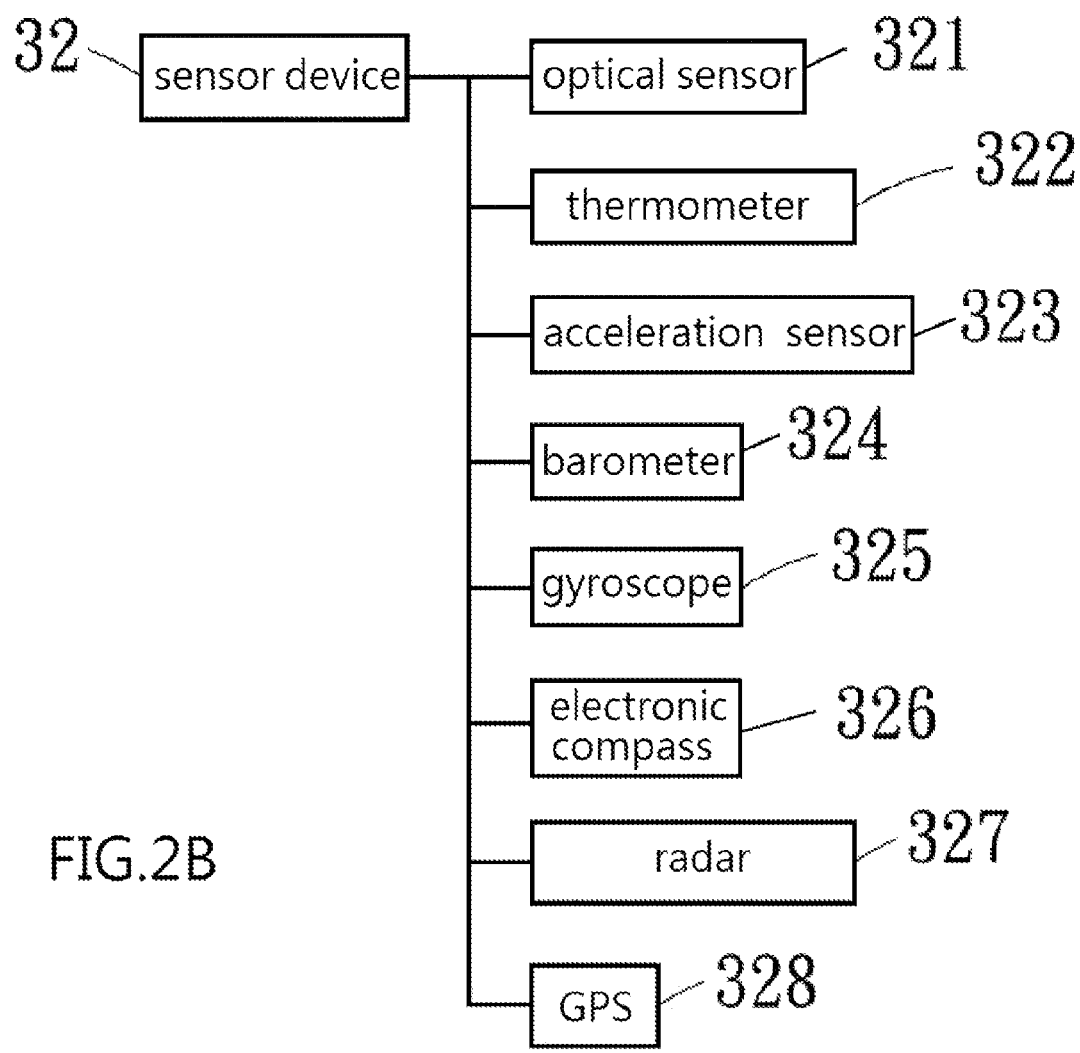
FIG. 2B is a block diagram of the sensor device.
Figure 2C:
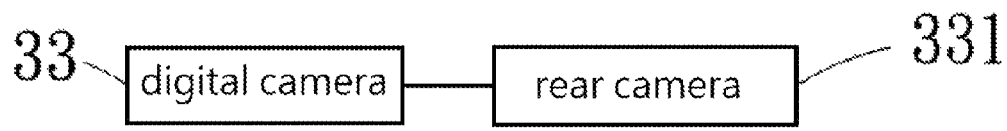
FIG. 2C is a block diagram of the digital camera.
Figure 2D:
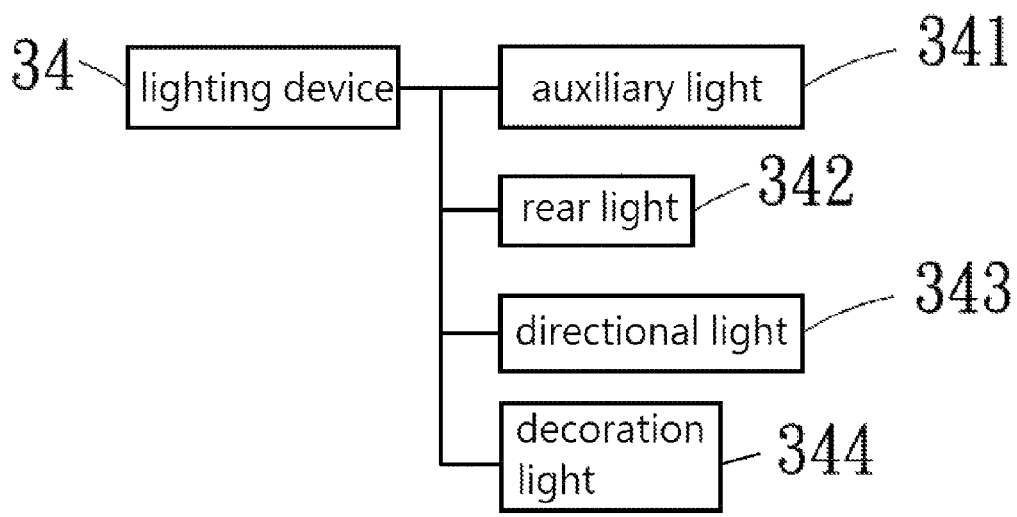
FIG. 2D is a block diagram of the lighting device.
Figure 2E:
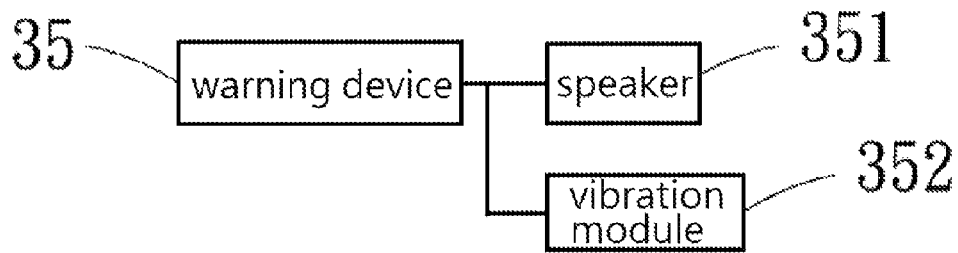
FIG. 2E is a block diagram of the warning device.
Figure 3:
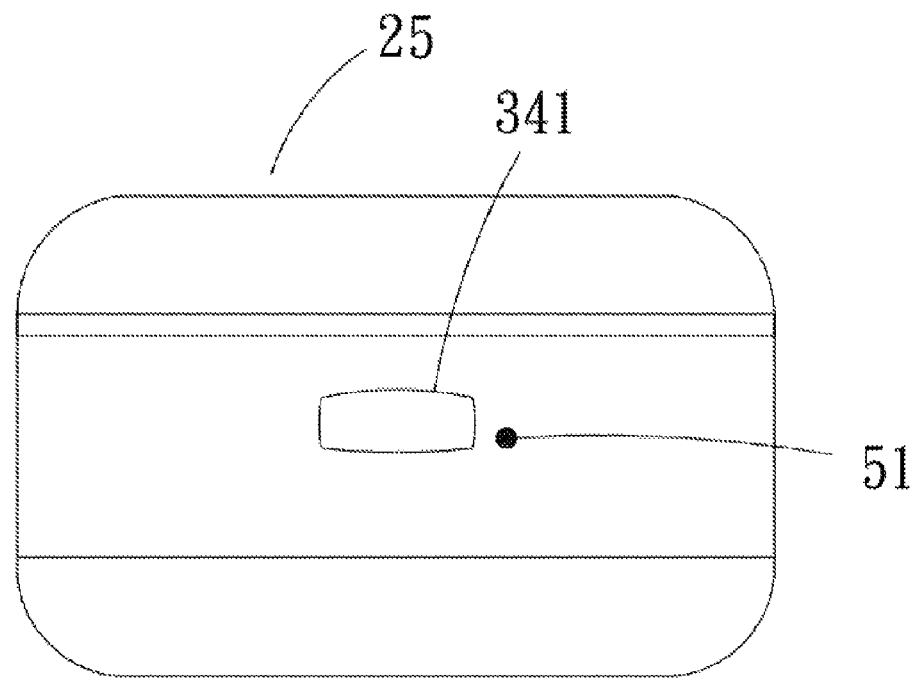
FIG. 3 is a front view of a bicycle seat bag incorporating a portion of the intelligent system.
Figure 4:
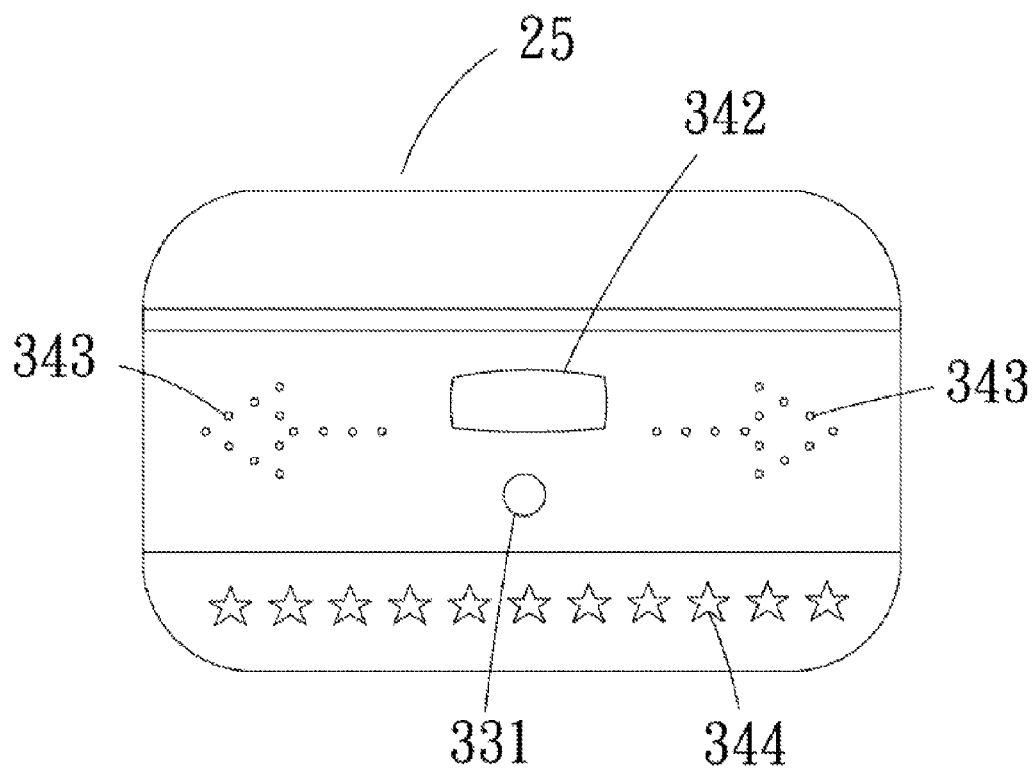
FIG. 4 is a rear view of the bicycle seat bag of FIG. 3.
Figure 5:
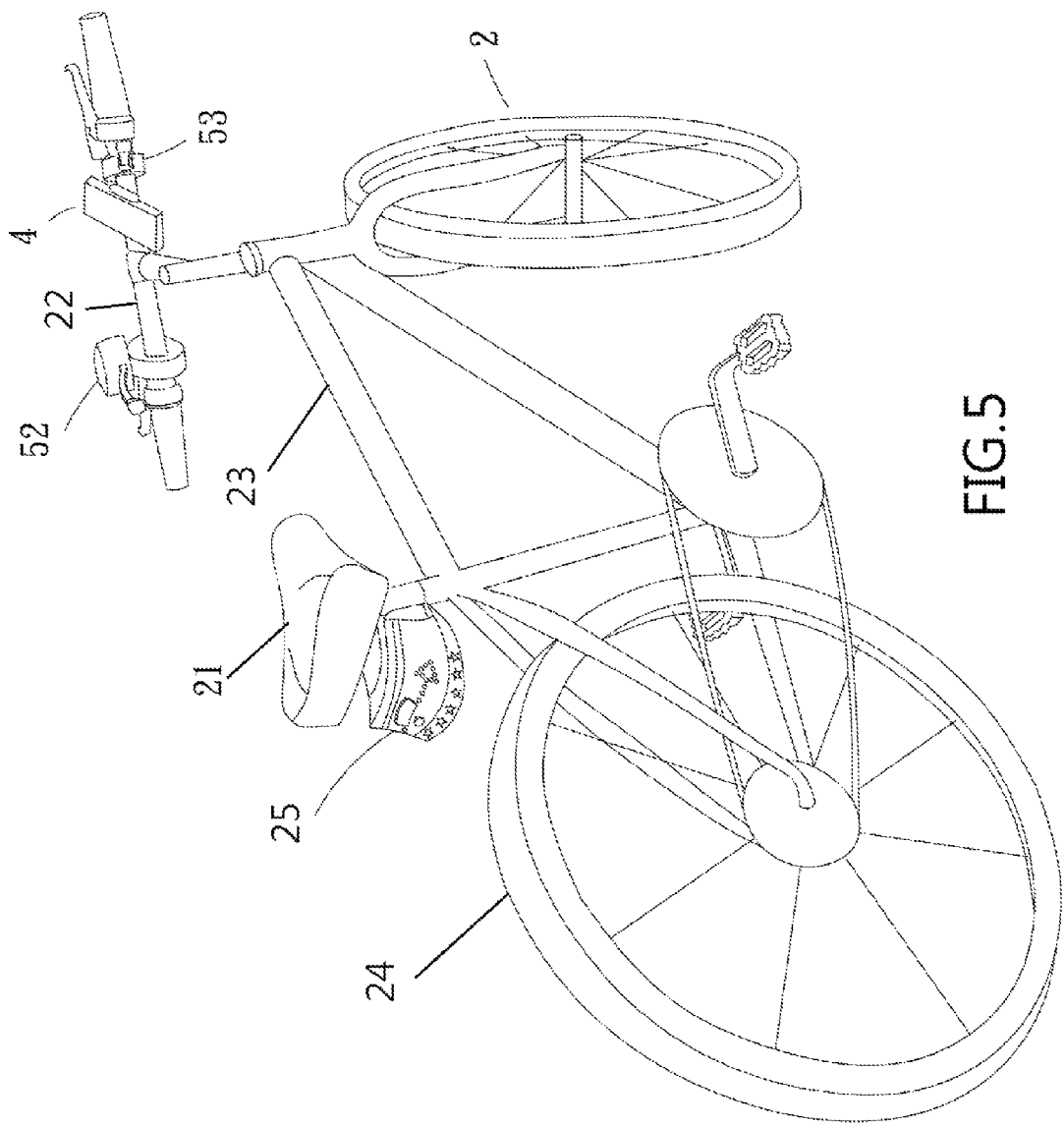
FIG. 5 is a perspective view of a bicycle mounted with the intelligent system.

Referring to FIGS. 1 to 5, an intelligent system 1 for a bicycle 2 in accordance with the invention comprises the following components as discussed in detail below.

A control assembly 3 is mounted on a seat bag 25 under a saddle 21 of the bicycle 1 and includes a seat bag control device 31, a sensor device 32, a digital camera 33, a lighting device 34, a warning device 35, and a power supply 36 for supplying direct current (DC) power to all of the above components so that they can be electrically interconnected.

A display assembly 4 is mounted on handlebars 2 and includes a liquid crystal display (LCD) screen 41, a processing module 42, a communications module 43, and a power module 44 all electrically interconnected. The LCD screen 41 is a touch screen panel. Alternatively, the display assembly 4 is replaced by a smart phone or a tablet computer.

The seat bag control device 31 is used to compress or decompress video files and audio files, transmit or receive data, perform numerical analysis, and perform automatic control. The seat bag control device 31 includes a microprocessor 311, a memory 312, and a wireless communications module 313 electrically interconnected. The sensor device 32 includes an optical sensor 321, a thermometer 322, an acceleration sensor 323, a barometer 324, a gyroscope 325, an electronic compass 326, a radar 327, and a global positioning system (GPS) 328. The optical sensor 321 is used to sense brightness of the environment. The thermometer 322 is used to measure temperature of the saddle 21. The acceleration sensor 323 is used to sense acceleration of the bicycle 2 when riding. The barometer 324 is used to measure atmospheric pressure of the location where the bicycle 2 is riding. The gyroscope 325 is used to measure orientation. The electronic compass 326 is used to show direction of the bicycle 2 when riding. The radar 327 is used to determine distance of a following vehicle. The GPS 328 is used to show location of the bicycle 2 when riding.

The digital camera 33 includes a rear camera 331 mounted on a rear end of the seat bag 25 for recording images from rearward. The lighting device 34 includes an auxiliary light 341 mounted on a front end of the seat bag 25, a rear light 342 mounted on a rear end of the seat bag 25, a directional light 343 mounted on a rear end of the seat bag 25, and a decoration light 344 mounted on a rear end of the seat bag 25. The warning device 35 includes a loudspeaker 351 and a vibration module 352. The loudspeaker 351 is used to make sounds or voice, issue an audio warning, or play music. The vibration module 352 is used to vibrate the saddle 21 for alerting purpose.

The display assembly 4 is used to show images and data sent from the seat bag control device 31 or set the seat bag control device 31. The wireless communications module 313 wirelessly communicates with the communications module 43 in the form of Wifi, Bluetooth, mobile phone access to the Internet, or electromagnetic wave of 2.4G wide band. The power supply 36 is rechargeable. For example, the power supply 36 is a rechargeable battery, a solar cell, a dynamo, or a combination thereof. The power supply 36 is mounted on the seat bag 25 or the frame 23 if it is implemented as a solar cell. The power supply 36 is mounted on the wheel 24 if it is implemented as a dynamo.

An auxiliary assembly 5 is mounted on both the seat bag 25 and the handlebars 22 and includes a microphone 51 mounted on the seat bag 25 and being in electrical connection with the seat bag control device 31 and the power supply 36 so as to record voice, a ring button 52 mounted on the seat bag 25 and being in wireless communication with the seat bag control device 31 for activating the loudspeaker 351 or not, and a light switch 53 for activating the auxiliary light 341, the rear light 342, the directional light 343, and the decoration light 344 or not. Alternatively, both the ring button 52 and the light switch 53 are interconnected to the seat bag control device 31.

It is envisaged by the invention that additional functions GPS, road images, ride recording, antitheft, audio alarm, and music playing are provided to a bicycle when riding. Thus, a rider can enjoy the ride.

While the invention has been described in terms of preferred embodiments, those skilled in the art will recognize that the invention can be practiced with modifications within the spirit and scope of the appended claims.

What is claimed is:

1. An intelligent system for a bicycle including a saddle, a seat bag, a frame, two wheels, and handlebars, comprising:
   a control assembly mounted on the seat bag and including
   a seat bag control device,
   a sensor device,
   a digital camera,
   a lighting device,
   a warning device, and
   a power supply for supplying direct current (DC) power to the seat bag control device, the sensor device, the digital camera, the lighting device, and the warning device for electrical interconnection; and
   a display assembly mounted on the handlebars and including
   a liquid crystal display (LCD) screen,
   a processing module,
   a communications module, and
   a power module for electrically interconnecting the LCD screen, the processing module, and the communications module;
   wherein the seat bag control device includes
   a microprocessor,
   a memory, and
   a wireless communications module electrically interconnected;
   wherein the sensor device includes
   an optical sensor,
   a thermometer,
   an acceleration sensor,
   a barometer,
   a gyroscope,
   an electronic compass,
   a radar, and
   a global positioning system (GPS);
   wherein the digital camera includes a rear camera;
   wherein the lighting device includes
   an auxiliary light,
   a rear light,
   a directional light, and
   a decoration light; and
   wherein the warning device includes
   a loudspeaker and
   a vibration module.

2. The intelligent system of claim 1,
   wherein the power supply is a rechargeable battery, a solar cell, a dynamo, or a combination thereof; and
   wherein the power supply is mounted on the seat bag or the frame if it is implemented as the solar cell, or the power supply is mounted on one of the wheels if it is implemented as the dynamo.

3. The intelligent system of claim 1, further comprising an auxiliary assembly including a microphone mounted on the seat bag and being in electrical connection with the seat bag control device and the power supply,
   a ring button mounted on the seat bag and being in wireless communication with the seat bag control device, and
   a light switch for selectively activating the auxiliary light, the rear light, the directional light, and the decoration light.

4. The intelligent system of claim 3, wherein the LCD screen is a touch screen panel.

5. The intelligent system of claim 4, wherein the display assembly is a smart phone or a tablet computer.

\* \* \* \* \*